(12) United States Patent
Drake

(10) Patent No.: X8217
(45) Date of Patent: May 24, 1834

(54) SHINGLES,BLINDS, SLATS, &C., SAWING

(76) Inventor: Isaac Drake

Isaac Drake of Minot Maine

Letters Patent

The Schedule referred to in these Letters Patent and making part of the
same containing a description in the words of the said Isaac Drake
himself of his improvement in the Machine for sawing Shingles and Blind
slats To all To whom these Presents shall come: Be it known that
I Isaac Drake of Minot in the County of Cumberland and State of Maine
have invented a new and useful machine for sawing shingles and slats for
blinds. and that the following is a full and exact description of the construc-
tion and operation of the said machine as invented by me.
The construction of the machine commences with a bed or bench which
consists of four pieces of plank of any suitable kind of hard wood. Two of
these pieces which constitute the length of the machine and are designed
to sustain the carriage and its appendages are ten feet in length. one foot
in width. and three inches in thickness. these pair of bed pieces are erected
on the edges at the distance of twenty one inches. and in a position par-
allel to each other being connected at the ends by two pieces of plank
of the same thickness. The end pieces are twenty inches wide. the lower
edges of the end pieces corresponding to those of the sides and the excess
of width extending above the side pieces. Grooves are made in the insides
of the bed pieces two and a half inches from the ends. the width of the
grooves corresponding to the thickness of the end pieces. and by means
of these the end and side pieces are united. That part of the end pieces
which extends above the side pieces is ten inches longer than the part
which occupies the space between them. and the excess of length extends
over and rests upon the side pieces. The other two bed pieces which con-
stitute the width of the machine and serve to sustain the shaft of the
circular saw and its dependents are five feet in length twelve inches
in width and three inches in thickness. These like the other pair of
Bed pieces are placed on the edges. in a position parallel to each other at the distance of three feet. The two pairs of bed pieces are placed transversely
across each other which is effected by cutting two gains in the underside of each
of the [long] Bed pieces. at equal distances from the ends. the space between
the gains corresponding to the space between the other bed pieces and the
width of the gains fitted to receive the thickness of the other pieces.
Like gains are also made in the short Bed pieces at unequal distan-
ces from the ends. The gains next to the end occupied by the saw-
being two and a half feet and the space between the gains correspon-
ding to the distance between the long bed pieces. The width of that
part of the short bed pieces which occupy the space between the long
ones is so reduced that the upper edges fall three inches below the up-
per edges of the long Bed pieces. The last described bed pieces are connect-
ed at the ends by end pieces that are seven by nine inches square.
These ends are united with the bed pieces by two suitable tenons on each
end of the end pieces and corresponding mortises in the bed pieces made
two and a half inches from the ends. the upper sides of the end pieces
being elevated two inches above the bed pieces which they connect.
The bed of the machine thus formed is supported by four sills of suit
able dimensions. one sill being placed under each end of each pair of
bed pieces. the ends of the bed pieces being sunk in suitable gains or mor-
tices made in the sills and the sills confined to the floor of the build
ing in which the machine works. On the insides and at the upper
edges of the long Bed pieces. are two plates of iron two inches wide and
one fourth of an inch thick. These plates may be either cast or
wrought iron. they rise five eighths of an inch above the bed pieces
and serve as a railway on which the carriage travels. they
are confined in their places by suitable screws that pass through
them into the bed pieces. The railway may extend the whole lengt
of the bed pieces or they may occupy such part of the space only
as is [illegible] to accommodate the motion of the carriage which
is about three feet and a half. The circular saw is of the common
size and construction and occupies the space between the long bed
pieces on the left side and the end pieces which connects the short bed pieces on the same side. The shaft which carries the saw is a solid cyl
indrical piece of iron two and a half inches diameter and about [illegible] feet long
including the gudgeons on the ends. The ends which connect the short bed
pieces serve as bearings to the saw shaft and in the centre of the length of these
end pieces are inserted suitable boxes made of some suitable kind of metal-
lic substance. These Boxes are not fixed but are moveable [illegible] and by this
moveable quality of the Boxes the position of the saw shaft is [illegible] and
the saw thereby kept in a position parallel with the carriage. The Boxes
may be confined by wedges or other suitable fastenings. On the right
hand end of the saw shaft and on the outside of the bed pieces is a pulley
twelve inches diameter and seven inches in thickness, and by passing a
band round this pulley and a drum or speed wheel constructed for the
purpose the saw is put in motion.
That part of the machine which gives motion to the carriage consists
of two solid cylindrical pieces of wood each of which is three feet in length
and eight inches in diameter. By a spiral groove made in the sur-
face of these cylindrical pieces from one end to the other, they are made
to resemble a screw. I therefore so denominate them and call one
of them a feeding screw and the other the increasing screw.
These screws are placed in a horizontal position and occupy the spaces
between the ends of the long bed pieces, and the intersecting cross pieces
of the bed. in each end of the screws are inserted iron gudgeons that
are one inch in diameter and the front and rear end pieces together
with the cross bed pieces serve as bearings of the screws. The distance
from the centre of the gudgeons of the screws to the inside of the bed
piece next to the saw is about eight inches. The feeding screw occu
pies the space next to the front end of the machine. The spiral groove
in this screw is made of sufficient depth say three fourths of an inch
and in passing round the cylinder once. the groove advances two inch
es and three fourths. and at the termination of the groove towards the
centre of the machine is fixed a piece of iron plate or other hard me-
tallic substance of suitable thickness and of the same width of the
groove. the outward end of the piece of plate being elevated about one inch above the surface of the cylinder for the purpose of [illegible] and
clearing from the screw the end of an iron [illegible] which in the operation the
screw travels in the spiral groove. The gudgeon in that end of the screw
which lays towards the saw shaft is about eleven inches long, and
extends beyond the bearing about eight inches. On this extension of the
gudgeon and near its bearing is a bevelled cog wheel thirteen inches di
ameter with fifty one cogs on the side next to the saw shaft. This
wheel receives motion from another wheel of like construction whose diame
ter is four inches with fourteen cogs that interlock with the cogs on the
larger wheel. The last described wheel (as also the first) works in
a vertical position and the shaft of this wheel which is of iron is one
foot in length and one inch diameter. This shaft passes through a
rail that extends from one cross bed piece to the other. and the out-
ward end of the shaft works in a perforation made through the long
bed piece about four inches from the cross piece. The above mentioned
rail is two and a half inches in thickness and six inches in depth
and is confined in its place by being framed into the cross bed pieces.
by suitable tenons on the ends of the rail and mortices in the cross pieces.
The space between the rail and the long bed piece on this side of the ma
chine is eight inches. and in this space upon the shaft of the smaller
cog wheel is a pulley eight inches diameter and six inches in thick
ness. This pulley receives motion from the saw shaft by means of a
suitable leathern band that passes round the shaft and pulley and
connects them in their operation. The receding screw occupies
the space between the rear end piece of the machine and the corres
ponding cross piece. both which serve as bearings of this screw. The
gudgeon in that end of the screw which lies towards the saw shaft passes
over its bearing and extends so far as to come in contact with the end of
the corresponding gudgeon of the other screw. The gudgeons are made [illegible]
at the ends which come in contact, about four inches of that which
pertains to the receding screw. and about two inches of the other. And
they are united by means of a coupling box. The coupling box is a cylin
drical piece of iron about three inches diameter and the same in thickness.

and a square perforation or mortice is made through the centre of the box
fitted to receive the square ends the screw shafts or gudgeons at the point of
contact. The spiral groove on the moving — screw is not uniform
in its rise or advance. But to prevent an undue concussion by too sud-
den reaction of the carriage. when the run of the saw through the bolt is
completed. the variation of the coil in its commencement at the out-
ward end of the screw is very trifling. the variation increasing gradual
ly in its progress towards the other end. In the termination of the groove
at the inward end of this screw is a piece of plate of the same dimensions
and for the same purpose as is described in relation to the other screw
The direction of the spiral coil in the two screws is diverse from each other
That is commencing at the outward ends of the screws they both pro-
gress in a direction towards the centre of the saw by means of which
the acting and reacting movements of the carriage are effected.

On the inside of the front end piece gains are made in the upper edg
es of the bed pieces two inches in width and the same in depth. and
in these gains is placed a moveable stop. which is a plank three feet
in length and six inches in width and two inches in thickness.
The width of this stop for the space of seven inches from each end is re-
duced to four inches leaving the part which is unreduced with square
shoulders. This stop comes in contact with and reclines against the in-
side of the front end piece. another stop of like construction is in the same
manner attached to the rear end piece.

The carriage is an oblong square frame consisting of two side pieces which
are five feet and a half in length. six inches width and two inches in
thickness. These side pieces are connected by two end pieces. that are
three feet in length ten inches in width and two and a half inches
in thickness. the sides and ends of the carriage are united by suitable
tenons on the side pieces and mortices in the end pieces. That side piece
which works next to the saw is framed into the end pieces about two inch-
es from the ends and the space between the side side pieces is about six-
teen inches. The centre of the thickness of the side pieces must correspond
to the centre of the width of the end pieces. on the under edges of both end pieces and at a line drawn at the centre of the width of the side pieces. The end pieces are cut upwards with a square shoulder to the underside of the side pieces and the width of the end pieces is reduced from said shoulders outwards to the ends of the end pieces. so that the under edges of the end pieces on the reduced parts form a level with the under sides of the side pieces. On the outside of both end pieces and extending over the whole of that part which retains the entire width first described is attached two blocks of wood. that are two inches in thickness and six inches in depth. The under edges of these blocks form a level with the under edges of the end pieces. and they may be confined in their places by any kind of suitable fastening. Into the side pieces of the carriage & extending from one to the other is inserted a piece of plank called the floor of the carriage. The plank which constitutes this floor is two inches in thickness. and its extent lengthwise of the carriage is about eighteen inches. and the space between the floor and the front end of the carriage is about nine inches. In the upper surface of the floor and extending crosswise of the carriage are three grooves the fourth of an inch deep and one fourth of an inch wide.

The space between the side of the floor towards the front or head of the machine and the first groove is three inches and the space between the respective grooves is six inches and a half. In these grooves are inserted plates of iron called ratchets. The ratchets project one fourth an inch above the floor and in the projections are teeth resembling those of a splitting saw. the inclination of the teeth being in a direction towards the saw.

The first and second ratchets are designed to be used in sawing shingles. the other is used in sawing slats for blinds and the teeth in this may be five eighths of an inch. to be varied, however, according to the thickness of the saw. On the outside of the end piece at the head of the carriage and about two inches from the side piece next to the saw is a square groove one inch and a half in width and half an inch deep extending vertically the whole depth of the end piece. An iron sliding bolt fifteen inches in length is fitted to work easily in the groove, the shape and size of the bolt being adapted to the groove. On the outside of the bolt and six inches from the lower end of the bolt is a projection with a square horizontal shoulder on the under side one fourth of an inch deep. A like projection and shoulder is made at the upper end of the bolt. On the outside of the end piece and on upper side of the block before described which is attached to the end piece is an iron catch placed in a horizontal position and fitted to hold the sliding bolt at the shoulder of the projection. The catch is one foot in length one fourth of an inch in thickness and one inch wide in the widest part, which is three inches from the end that embraces the sliding bolt. at which one the width is reduced to a point. From the widest part of the catch towards the other end, the reduction of the width is gradual and is only one fourth of an inch at the end. The catch is secured in its position by an iron bolt or pivot which passes through the catch at the widest part into the block upon which it is located. That end of the catch which embraces the bolt is kept in close contact with the end of the carriage by a light steel spring which occupies the space between the outward end of the catch and the end piece of the carriage. The sliding bolt being located directly over the centre of the diameter of the feeding screw: and the lower end of the bolt being beveled on the sides so as to correspond to the variation of the coil of the screw the end of the bolt falls into the spiral groove. and by the operation of the screw upon the bolt the forward movement of the carriage is effected. A sliding bolt catch and spring of like construction and location are also attached to the end piece at a tail of the carriage. with this difference however, in the bolt Viz. Five eighths of an inch of the lower end of the bolt is made round in form of a gudgeon. and horizontally upon this gudgeon is placed a friction roller two and a half inches diameter. half an inch in thickness and is secured in its place by riveting the end of the gudgeon — which is half an inch through. This friction roller on the end of the bolt falls into the spiral groove in the inversing screw & by the operation of the screw upon the bolt the inverse movement of the
carriage is effected. The carriage thus constructed is fitted to
travel upon the iron railway upon four friction rollers that work in mor
tices made in the under sides of the side pieces of the carriage The space
between the mortices and the end pieces of the carriage is about four inch
es and the dimensions of the mortices must be adapted to the size and
construction of the rollers whose diameter is four inches and thickness
three fourths of an inch with wrought iron shafts through their
centre that are three fourths of an inch through. The shafts which
serve as gudgeons work in semicircular excavations made in the
under sides of the side pieces of the carriage at the sides of the mor
tices. To secure the gudgeons in their places straps of iron with
like excavations are attached to the under sides of the side pieces
of the carriage by suitable screws or other fastenings. To guide the
carriage in its movements on the railway and to facilitate the re-
duction of friction There are made in the lower part of the end pieces
of the carriage at the square shoulders before described and about
one inch and half from the bottom square excavations or mortices
in which are placed friction rollers two and a half inches diame
ter and five eighths of an inch in thickness. through these rollers
in round perforations made at the centre iron pins or bolts are
passed and on these the rollers revolve. These rollers project
outwards beyond the shoulders in the timbers in which they are
placed: and come in contact with the sides of the iron plates that
constitute the railway. A traversing carriage is constructed to operate
on the one before described This carriage consists of a bed piece which is an
oblong square piece of plank one foot in width, and two and a half inches
in thickness with a piece of timber framed on each end with tenons on the
ends of the bed piece and mortices in the end pieces. The end pieces are three
feet in length six inches in width and two and a half inches in thickness
The distance between the end pieces is about four feet.
On the upper surface of the carriage and extending its whole length is a groove
three inches in width and five eighths of an inch deep. The space between the groove and the side of the carriage next to the saw exceeds that of the oppo-
site side three fourths of an inch. In this groove is worked an iron slide
six feet and ten inches in length. three inches in width and five eighths
of an inch in thickness. On the upper side of the bed piece and extending
its whole length. directly over the first ratch in the floor of the other car-
riage. as before described is a groove two inches wide and one fourth of an
inch deep. and in this groove one inch and a half from the backside of the
bed piece is a square mortise made through the bed piece. which is the width
of the groove one way and three inches the other way. In this groove and
mortise is placed an iron setting guage which is an iron plate eight inch-
es in length and of the same width and depth as the groove. That part of
the plate which covers the slide is depressed one fourth of an inch to let
the slide pass over it. The transition from the elevated to the depressed part
of the plate is made by a shoulder that is vertically square. but horizontal-
ly convex. The shoulder commences on the side of the plate next to the head
of the machine, at the side of the groove in which the slide works. But
it projects into the groove one inch at its termination. The width of the
slide is diminished on the side next to the shoulder sufficiently to accom-
modate the said projection. Appending from the under side of the plate
and within the square mortise above described is a solid square piece of
iron the width of the plate one way. one inch and a half the other way
and extending downwards within half an inch of the under side of the bed
piece. On the upper side of the guage and about the centre of the width of
the slide is a spur which rises about one fourth of an inch above the surface
of the guage. This spur is fitted to work in a long aperture or mortise made
through the slide. The mortise which is four inches in length and half an
inch in width. commences about three fourths of an inch from that side
of the slide which is towards the shoulder in the guage, and passing oblique-
ly towards the other side of the slide. terminates at the above described spur.
and the spur enters within the mortise. By an operation of slide upon the
spur, in the inward movement of the under carriage. the spur is forced along
in the oblique direction of the mortise. and the upper carriage is thereby drawn
towards the saw. the space of one cog or tooth in the ratch beneath. where it is confined while the saw is repeating its operation upon the bolt. by means
of two dogs that pass vertically through the setting gauge. These dogs are
two iron bolts about five eighths of an inch through. one is inserted in a
perforation made vertically through the gauge near the shoulder. the lower end
being fitted to catch and hold against the teeth on the ratch.
The upper end of this dog at about two inches above the bed of the carriage
turns outwards in the form of a knee. The length of this bolt from the knee
outwards to the end is about four inches. The other dog passes through the gauge about
an inch and a half nearer the outward end. About two inches and a
half of the upper end of this dog is made flat. through the flat part is an
aperture one inch and a half in length up and down and half an inch
wide and through this aperture the inclined part of the other dog passes.
The lower end of this dog also is fitted to the teeth on the ratch. Two other setting
guages of like construction location and operation and with like upper
dogs are attached to the other ratches. On the inside of the bed piece op-
posite to the location of the setting guages and extending through the whole
space occupied by them is a notch cut the whole thickness of the bed piece
from the side inward to the ends of the setting gauges. Near the same
side of the bed piece and towards the tail end of the machine is a circular
excavation, seven inches and a half diameter and one inch and three fourths
deep. In this excavation is placed horizontally a kind of zig zag wheel
the upper side of which presents two surfaces of different diameters. The large
diameter is seven inches and the smaller diameter is about five inches.
The larger diameter is divided into six equal sections, and the upper side of
each section is formed into an inclined plane. the descent of the plane being
in a direction towards the saw and consequently forming at each elevation
a square shoulder half an inch deep and thereby converting this surface into
a sort of ratch wheel. this wheel receives motion from the slide by means of
hand or [illegible] which is a curved piece of iron about five inches in length and
three eighths of an inch through. One end of this arm is made flat and
attached to the underside of the slide by a rivet that passes through them
both. and the other end resting on the wheel. By the movement of the
slide in a direction towards the tail of the machine the hand is forced agains one of the above described shoulders of the wheel which makes one sixth of a
revolution, and by a counter movement of the slide the hand returns to its first
position and embraces another shoulder of the wheel. The under surface of
the wheel is also divided into six equal triangular divisions. the lines of divisions
corresponding to those of the other divisions. One half of these divisions are
depressed in height about seven eighths of an inch leaving every other divis-
ion elevated seven eighths of an inch above the depressed parts. The wheel
projects over the side of the bed piece through an opening made by the exca-
vation. about one inch and it revolves on a pivot that is inserted in a
round perforation made through the wheel at the centre. Directly over
the centre of said wheel and extending over the length of the above described
notch in the side of the bed piece of the carriage: is a round iron rod five
eighths of an inch through. and two feet nine inches in length.
This iron rod or shaft is sunk half its thickness in the timbers upon
which it bears and it passes through two knobs which are circular pieces
of cast iron two inches diameter and five eighths of an inch in thickness. The
knobs protuberate from the shaft in directions opposite to each other.
One of the knobs is placed directly opposite to the space between the third and
second setting gauges. and the other directly opposite the first gauge
On the upper side of the shaft and directly over the above described wheel
is attached a piece of iron plate six inches in length and one inch width.
About an inch and a half at each end of this plate is bent curving down
ward til they come in contact with the wheel. and these sloping parts are
obtusely tapered to the ends. By the operation of the wheel upon the sloped
ends of the cross plate of iron. the iron shaft is turned alternately from
right to left. and the knobs are brought to bear reciprocally against the
dog block by means of which the position of the block is varied and the
setting for butts and points of shingles is effected. In sawing slats for blinds
the iron shaft with its appendages is dismissed. The dogs are construct-
ed to work on a plate of iron two feet and three inches in length. two inch-
es in width and half an inch in thickness. In the middle of this plate
and extending about one third of its length is a semi circular extension of
the width of the plate on the outward edge of which is a semi circular elevation or ridge which is in extent about three fifths of the semicircular
part of the plate. On the ridge are twenty teeth very like those on the racks
before described. To this plate is attached a pair of dogs which are two cur
ved pieces of iron thirteen inches in length. one inch and a half in width
and three eighths of an inch in thickness. and at one end of each is a claw.
~~and~~ at the other end extending about five inches from the end; are cogs or
teeth. the part occupied by the teeth being straight. The dogs are placed
on the plate with the concave sides towards the saw. the claws inclining —
towards each other and projecting over the plate so as to receive the bolt
which is to be wrought. The dogs are secured in their position by three loops;
one placed at each end and ranging with the length of the plate. the other
is placed in the centre and ranges crosswise of the plate. The loops at the
ends of the plate eight inches long. one inch and a half wide and one fourth
of an inch thick. These are turned down at the ends so as to elevate
them above the thickness of the dogs. and are confined to the plate by rivets.
The centre loop is confined at one end only. which is the end towards the
saw. Under the centre loop and between the dogs is a spur wheel or
pinion two inches and a half diameter which interlocks with the cogs
or teeth on the dogs. An iron shaft passes vertically through the
loop and pinion the lower end of which works in the plate in the manner
of a gudgeon. The upper end of the shaft extends above the loop about
three inches on which is affixed a lever by which the pinion is made
to operate on the dogs. extending them to receive and contracting them to
grasp and hold the shingle bolt. In the under side of the lever and
directly over the semicircular ridge on the plate is inserted a spur
adapted to hold against the teeth on the ridge. A second perforation
is made thro the lever outside of the ridge and in this perforation is an
iron bolt with a hook on the lower end fitted to catch under the edge of
the plate. by means of which the lever is confined in the position in which
it is placed. and the grasp of the dogs upon the bolt is thereby secured.
The dog plate is confined by two iron bolts to a block of wood that is two
feet in length. eight inches in width and two inches in thickness.
This block is placed on the carriage over the catch before described and to complete construction of the block a piece of plank is attached to the underside
of the piece already described extending the whole length of the notch. and
the whole depth of the carriage. The block is secured in its position by a screw
bolt which extends outward from the upper side of the bed piece of the car-
riage and passes through the side piece of the block. ~~and passing through~~
~~the side piece of the blocks.~~ at the centre of its length where a suitable
nut is fixed on the screw and upon this screw as upon a pivot. the
changes of the position of the dog block and consequently of the shingle bolt
are made. whereby through the operation of the knobs upon the block as
before described. the alternate settings for the butts and points of the shin-
gles is effected. On the underside of the bed piece of the upper carriage &
extending the whole width are grooves made to accommodate the ratchets
in the floor. Thro that end piece of the carriage which lies towards the
tail of the machine are passed two screw bolts that press against two
small pieces of iron plate which are placed in cavities made in the side
of the end piece. and by means of these screw bolts the carriage is kept
from working too loosely. The dog plate must be elevated before
the bolt is placed in the dogs. by means of which the bolt will settle on
the carriage as the width is diminished. A set of dogs different
from those before described are constructed to be applied in the use of
this machine. if preferred. These dogs are fitted to work on a plate
of the same size and construction of the one before described; except-
ing the semicircular ridge with teeth. the dogs are two pieces of iron; each
about six inches in length, one inch and a half in width, and three
eighths of an inch thick. On one end of the dogs are claws fitted
to grasp and hold the shingle bolt. Two round perforations are
made through each of the dogs. one near the centre of their length
the other near the end. They are attached to a plate by iron bolts, pas-
sed through them, and the plate at the perforations made at the cen-
tre. A lever is fixed on and confined to the plate by a screw bolt that
passes through the lever and the plate at the centre with a thumb screw
on the top of the bolt. Upon this screw bolt the lever operates as upon a
pivot. The dogs are connected with the lever by two straps of iron which pass from them to the lever. and are confined by suitable rivets. all of which must work easily in the perforations in which they are mounted. The end of one strap is attached to the lever in front and the other in rear of the pivot on which the lever works.

The knobs which operate upon the dog block must be placed nearer together for short bolts than for long ones. The specific new and useful improvements herein before described and claimed by me as the first inventor are the following. 1st The mode of moving the carriage by screws. – 2nd The mode of reducing friction and guiding the carriage in its movements by the application of friction Rollers.

3d The particular construction of the dogs and the mode of applying them to the bolt. – 4th The particular mode of changing the position of the bolt so as to saw different lengths.

5th The particular mode of keeping the bolt firmly on the carriage by means of elevating the dog plate when the bolt is first applied.

6th The particular mode of setting for the thickness of the shingles &c to be sawed.

The improvements described in the foregoing specification. give to the machine advantages over other shingle machines in equality and and regularity of motion. consequently less liability to injury or derangement of the parts by concussion.

In testimony that the foregoing is a true specification of my said improvement. I have hereunto set my hand the twenty second day of February in the year of our Lord one Thousand Eight Hundred and Thirty four Isaac Drake Exd. Witnesses
W.C. Ezra Fiske
Francis Morrell (6258 Words)